(12) United States Patent
Dekker (10) Patent No.: US 8,447,562 B2
(45) Date of Patent: May 21, 2013

(54) INSPECTION APPARATUS AND METHOD USING PENETRATING RADIATION

(75) Inventor: Alain Dekker, Woking (GB)

(73) Assignee: Illinois Tool Works, Glenview, IL (US)

(*) Notice: Subject to any disclaimer, the term of this patent is extended or adjusted under 35 U.S.C. 154(b) by 494 days.

(21) Appl. No.: 12/669,118

(22) PCT Filed: Jul. 9, 2008

(86) PCT No.: PCT/US2008/069522
§ 371 (c)(1),
(2), (4) Date: Jun. 8, 2010

(87) PCT Pub. No.: WO2009/012097
PCT Pub. Date: Jan. 22, 2009

(65) Prior Publication Data
US 2010/0256952 A1 Oct. 7, 2010

(30) Foreign Application Priority Data

Jul. 16, 2007 (GB) .................................. 0713780.5

(51) Int. Cl.
*G06F 17/18* (2006.01)
(52) U.S. Cl.
USPC ............................... 702/180; 702/28; 702/40
(58) Field of Classification Search
USPC ............... 702/28, 40, 49, 101, 134, 137, 156, 702/172, 173, 180; 378/54
See application file for complete search history.

(56) References Cited

U.S. PATENT DOCUMENTS

| 3,983,368 A | 9/1976 | Csakvary et al. |
| 5,585,603 A | 12/1996 | Vogeley, Jr. |
| 6,023,497 A | 2/2000 | Takahashi et al. |
| 6,347,131 B1 | 2/2002 | Gusterson |
| 2009/0147987 A1 | 6/2009 | Hirose |

FOREIGN PATENT DOCUMENTS

| DE | 1803372 A1 | 5/1970 |
| GB | 1461195 A | 1/1977 |
| JP | 60014128 A | 1/1985 |
| JP | 2002296022 A | 10/2002 |
| WO | 2007058212 A1 | 5/2007 |

OTHER PUBLICATIONS

ISR for PCT/US2008/069522 mailed Sep. 23, 2008.
UK Search Report for GB0713780.5 mailed Nov. 9, 2007.

*Primary Examiner* — Michael Nghiem
*Assistant Examiner* — Paul D Lee
(74) *Attorney, Agent, or Firm* — Lowe Hauptman Ham & Berner, LLP (57) ABSTRACT

A method of determining a parameter of an object using penetrating radiation such as X-rays. The parameter of the object could be weight or mass or volume. The method comprises the step of passing the penetrating radiation through the object; determining a first value derived from the total energy of penetrating radiation absorbed by the object; determining a second value related to the mean energy per unit area of penetrating radiation absorbed by the object and determining the parameter from the first and second values. An algorithm representing a proportionality relationship is derived from the first and second value. The parameter is determined by establishing an exponential relationship to an amount derived from the algorithm.

11 Claims, 4 Drawing Sheets

INSPECTION APPARATUS AND METHOD USING PENETRATING RADIATION

RELATED APPLICATIONS

The present application is National Phase of PCT/US2008/069522 filed Jul. 9, 2008, and claims priority from British Application Number 0713780.5 filed Jul. 16, 2007, the disclosures of which are hereby incorporated by reference herein in their entirety.

AIM

The present invention relates to a method and apparatus which uses penetrating radiation to effect non-contact analysis of an object.

INTRODUCTION

It is known to use penetrating radiation such as X-rays to monitor and inspect products in a production process.

In a typical production process, the product is inspected at various stages to ensure product integrity prior to final packaging and dispatch of the product. In the commercial processing of foodstuffs for example, product integrity may involve one or more of the following: ensuring that each portion of foodstuff has the correct weight, contains no contaminants or product anomalies, the correct number of packs are contained within a multi-pack and the proper amounts of product are contained in each pack. For example in the production of prepared meals comprising a number of pouches or sachets which are packaged in an outer wrapper, it is necessary to inspect the packages to determine that all of the pouches or sachets are present and correctly filled.

In a conventional device for inspecting products such as prepared meat, other foodstuffs, or any other materials permeable to X-rays, a conveyor is provided for transporting the products through an inspection zone. A source of X-rays is located adjacent to the inspection zone and directs a beam of X-rays through the products as they are carried through the inspection zone on the conveyor. The X-ray beam is typically shaped by a pair of aperture plates to form an irradiation zone through which the products pass. The irradiation zone is narrow in the conveying direction but sufficiently broad in the orthogonal directions to irradiate each product entirely as it passes through the inspection zone on the conveyor. In alignment with the irradiation zone, and opposite the x-ray source with respect to the path of travel of the products, a linear array of photodiodes is arranged. A phosphorescent strip is mounted next to the array of photodiodes, so that X-rays from the source pass between the aperture plates, through the product, and strike the phosphorescent strip. Each point along the length of the phosphorescent strip emits visible light in proportion to the strength of the X-ray radiation striking the strip at that point, and this visible light is converted by the array of photodiodes into electrical signals. The signal from each photodiode represents the strength of the X-ray beam at that point along the array. Typically the X-ray source and the detector components are positioned one above and the other below the conveyor, with the photodiode array extending transversely to the conveyor's direction of movement. However other arrangements are possible, for example with the X-ray source and detector transversely opposed on either side of the conveyor.

The intensity of the X-ray radiation striking the phosphorescent strip at any one time is dependent upon the physical parameters associated with the product such as density and thickness. A variation in the thickness or density causes the amount of light emitted at each point along the length of the phosphorescent strip to be modulated. The array of photodiodes detects this modulated light emission, and by repeatedly sampling the outputs of the individual photodiodes in the linear array, the product is scanned as it passes through the irradiation zone. The outputs of the photodiodes are conventionally displayed as a video image of the passing product.

In the case of prepared meat products for example, any bones remaining will resist penetration of X-rays to a greater extent than will the meat, and thus the photodiode which falls in the "shadow" of the bone will be illuminated to a lesser extent than will photodiodes which receive X-rays passing through the meat. Thus the presence of any bone or other body more resistant to X-rays can be detected in the video image as a dark area. The product concerned may then either be reprocessed or discarded from the production line.

In an alternative use for the inspection equipment, the absence of the product may be detected. For example, in the final inspection of multipacks of food items such as cakes or pies, the packages may pass through the irradiation zone and the photodiode outputs are used to form a video image of the packaged items. By monitoring the image, the number of items present within the package can be verified, since a missing item appears as a lighter image area than would otherwise be expected.

Verification of the presence or absence of foodstuffs may involve comparing the detected light level with a predetermined "ideal image" by the operative monitoring the video display. A decision is made on the basis of whether the image is too dark, when foreign bodies are to be detected, or the image is too bright when the absence of an inspected item is to be detected.

A conventional X-ray inspection machine as described above does not always provide the full analysis that is required prior to final dispatching of a product. Additional physical parameters associated with the foodstuffs such as weight or volume may have to be determined. This may be dictated by legislation or commercial reasons. For example legislation may dictate the permissible underweight of goods sold by weight. Any overweight in the goods is translated into lost earnings for the seller or producer. As a result statistical process control techniques are increasingly being used to control the quantity of product being dispatched, between upper and lower control limits. Any products falling outside these limits are rejected and any products within these limits are certified as acceptable.

Various attempts have been made to analyse the amount of product present in a given portion, lot or package, prior to being dispatched. These include weighing the products by a gravimetric checkweigher in conjunction with the use of a conventional X-ray inspection machine or a metal detector for determining product integrity. In this set up, the manufacturer needs two machines, one for inspecting or monitoring any product anomaly such as the use of an X-ray inspection machine or metal detector and the other for determining the amount of the product by weight. Typical means for measuring the product's weight range from the use of a simple manual scale to a complex device using a load cell to convert the weight of the product on a conveyor to an analogue and then a digital signal.

However, the main disadvantage of such techniques is that they cannot simultaneously check or monitor for the amount of product and for contaminants in the product without the need to carry out these monitoring steps sequentially, i.e. by having two machines. Secondly, it is not possible to convey more than one product lane across a gravimetric checkweigher simultaneously. Thirdly, the checkweigher needs to be absolutely level.

In an attempt to overcome such problems, U.S. Pat. No. 6,347,131 describes a technique for non-contact measurement of the volume of a product using the X-rays in a conventional X-ray inspection machine. Here the volumetric measurement of an object passing through a radiation zone is determined on the basis of the outputs of an array of detectors sensing radiation which has passed through the object. It is based on the principle that the attenuation of the radiation passing through the object is proportional to the thickness of the object. By measuring the attenuation of the radiation passing through successive areas of the object using the array of detectors a thickness value is determined for each area. The volume of the object is thus determined by adding up all of the measured thickness values. Although such a technique is advantageous since it allows simultaneous inspection and the determination of the amount of the object passing through the irradiation zone without the need of extra devices or machines, it is generally limited to products that are homogenous such as cheese. This is because the thickness is determined by effectively taking slices through the object as the X-rays scan across the product between the X-ray source and the detector. In products that are non homogenous such as bread or cake having an outer dense crust layer, the variation in density may introduce errors in the thickness determination which is thus reflected in the calculated volume. Secondly, although some products may appear to have an acceptable volume calculation, inhomogeneity in the product such as variations in density or as a result of packaging may cause the determined weight or volume of the product to fall outside acceptable accuracy levels dictated by industrial standards or legislation.

An analysis method and apparatus is thus required that can monitor the product's weight or volume inter-changeably or simultaneously and yet be able to inspect or monitor the product for integrity or product anomalies such as any contaminants or imperfections.

STATEMENT OF THE INVENTION

The present applicant has realised that the attenuation of penetrating radiation through an object is proportional to the weight or volume or mass of the object and thus can be used to determine such parameters. The present applicant has mitigated the above problem of more accurately determining a parameter such as weight or volume or mass associated with the object using penetrating radiation. Accordingly, the present invention provides a method of determining a parameter of an object comprising the steps of:
 a. passing the penetrating radiation through the object;
 b. determining a first value derived from the total energy of penetrating radiation absorbed by the object;
 c. determining a second value related to the mean energy of penetrating radiation absorbed by the object;
 d. determining the parameter from the first and second values.

For example the parameter can be the volume and/or the weight and/or the mass or a similar physical parameter of the object. By establishing a proportionality relationship between the first and second values derived from the penetrating radiation such as X-rays and the parameter associated with the object such as volume or weight, the volume and/or weight of the object can be determined. Where the object is a product in a production process, the ability to determine such a parameter using the penetrating radiation ensures that the product integrity such as the presence of any product anomalies or contaminants in the product and weight or volume can be checked simultaneously prior to final packaging and dispatch without the need for any further inspection devices or machines. This allows faster throughput of the products to final packaging and the possibility to convey more than one lane of products through the inspection device simultaneously.

In an embodiment of the present invention, a detector is used to generate a signal in response to the penetrating radiation incident upon it and the signal is used to form an image of the object. By the use of processing techniques the signal can be used to determine the total energy and the mean energy of the penetrating radiation absorbed by the object. More preferably a histogram derived from the image corresponds to the energy absorbed by the object. The energy of the penetrating radiation is represented as discrete brightness levels of a plurality of pixels in the image. The first value representing the total energy of the penetrating radiation absorbed by the object and the second value representing the mean energy of the penetrating radiation are derived from the histogram.

In a preferred embodiment of the present invention, an algorithm representing the proportionality relationship is derived from the first value and second value such that an exponential relationship is established between the parameter and an amount determined by the algorithm. Since it is known that the penetrating radiation attenuates through the object exponentially, the present applicant has established that the attenuation of the penetrating radiation is proportional to the weight or volume of the object such that the weight or volume follows a similar exponential relationship to the attenuation of the penetrating radiation. Preferably the algorithm is any one of VH×(N−MH) or VH×ln(N−MH) or VH×(N−MH)$^2$ where VH is the volume of the histogram (equivalent to the first value); MH is the mean of the histogram (equivalent to the second value) and N is the number of discrete brightness values per pixel; although other forms of algorithm may also be effective for other kinds of object. The different algorithms take into consideration different possible kinds of variation of the object properties such as density or surface configuration or the presence of packaging and as a result a more accurate calculation of the object's parameter can be determined. More preferably the parameter associated with the object is given by the equation $y=ce^{b(amount)}$ where y is the parameter such as weight; amount is the value derived from the algorithm and c and b are first and second constants.

In further aspect of the present invention, the method includes a calibration stage having the steps of (a) passing a plurality of sample objects through the penetrating radiation for each of which the parameter value is known; and (b) determining the corresponding amount for each sample object from the algorithm. Each object may be passed through the radiation a number of times in order to determine an average amount for that algorithm and parameter value. The calibration is preferably performed using each of the above algorithms and the algorithm which provides the best exponential fit between the parameter and the amount is chosen. Only a few calculations of the amount are needed and standard statistical techniques such as regression analysis can be used to find the closest fit having the highest $r^2$ value. Not only may the algorithms specifically mentioned above be checked to determine which one best fits the parameter/amount data points, but any other algorithm may be included in the calibration process and then (if it produces the best exponential fit) used to determine the physical parameter of subsequently inspected objects of the same type. As a result the inspection device can be calibrated for checkweighing or mass or volume determination relatively quickly prior to the start of a production process. Once an algorithm has been chosen which best fits the exponential relationship the same algorithm is used to determine the amount for further similar objects for the determination of the weight or other desired parameter of the object by the exponential relationship.

Further preferred features and aspects of the present invention will be apparent from the claims and the following illustrative description made with reference to the accompanying drawings.

DESCRIPTION OF THE PREFERRED EMBODIMENTS

Figures 1, 2:
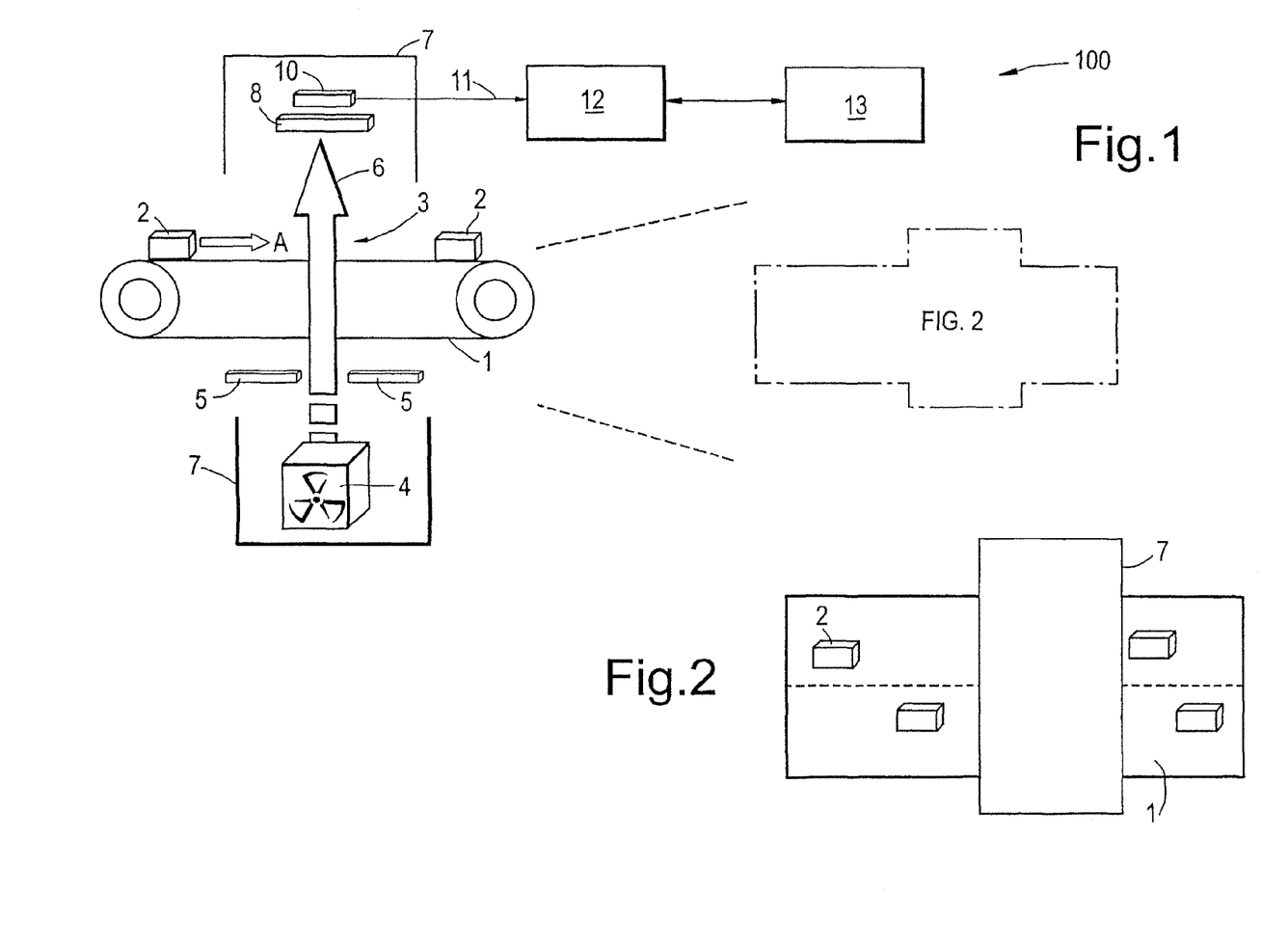
FIG. 1 is a schematic representation of an X-ray checkweigher device.
FIG. 2 is a schematic plan view of the apparatus of FIG. 1, showing multiple product lanes.

A checkweigher 100 which can be used in an embodiment of the present invention is shown in FIGS. 1 and 2. It comprises is an X-ray inspection device known in the art (see e.g. U.S. Pat. No. 6,347,131) having a conveyor 1 for carrying a series of products 2 at a known speed through an inspection zone 3 of the checkweigher in the direction of the arrow A. The product may be any radiation permeable substance or object, such as pharmaceutical preparations, and is not limited to foodstuffs. The products 2 may pass through the inspection zone 3 in a single lane or multiple lanes (2 lanes being shown in FIG. 2).

A radiation source 4 and a pair of aperture plates 5 are positioned adjacent to the conveyor (below it, as shown). The aperture plates 5 are opaque to the radiation from the source 4, and shape an irradiation zone or beam 6 of substantially planar configuration, orientated orthogonal to the conveying direction A. The radiation source 4, aperture plates 5, inspection zone 3, and the detector formed by the phosphorescent strip 8 and photodiode array 10, are contained within suitable biological shielding 7.

Situated opposite the radiation source with respect to the conveyor 1 and aligned with the irradiation zone 6 is a phosphorescent strip 8, beyond which is disposed a linear array 9 of photodiodes 10. The phosphorescent strip 8 is sensitive to the radiation beam 6, and emits visible light towards the photodiodes 10 in response to the radiation beam incident upon it. The output signal from the photodiode array, after any necessary pre-processing such as temperature compensation and analogue to digital conversion, is supplied via a connection 11 to a processor 12 which may be a personal computer having a user interface such as a touch screen 13. Alternatively the data processor may be any other suitable programmable computer or microprocessor, or any other dedicated electronic circuitry capable of carrying out the necessary data processing operations as described in this specification.

In terms of the digital output of the diode array, it is desirable that the range of each diode is divided into the same number of steps or brightness levels, so that each diode output will correspond to one of a predetermined number of illumination levels. In a typical application using an 8-bit image the range of each diode can be divided into 256 steps or discrete brightness levels. This means that for a typical 8-bit image each pixel in the image is divided into discrete brightness levels between absolute black (0) and absolute white (255). The value of each pixel or brightness level is therefore proportional to the energy of the X-rays incident on the detector at any one time. However, the number of discrete steps is not restricted to 8-bit per image pixel and 12, 14 and 16 bits could be substituted, for example.

X-rays interact with matter in two principal ways. The most common is attenuation, whereby X-rays are absorbed by the material as they pass through. The energy in each X-ray photon is subsequently dissipated by vibration of chemical bonds (heat). A secondary interaction is called Compton scattering whereby energy is transferred to an electron. The electron moves off in one direction and the X-ray photon moves off in a different direction but with a lower energy. This type of interaction is more common the lower the initial energy of the X-ray and increases the noise of the image. To reduce the level of noise higher frequency X-rays are used, i.e. increased voltage of the X-ray source. For the purpose of the present invention higher frequency X-rays are more desirable.

Figure 3:
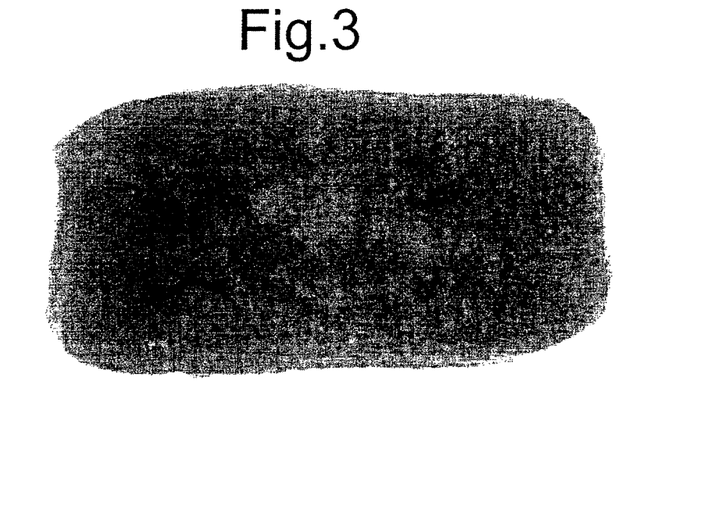
FIG. 3 is an X-ray image of a loaf of bread with a hard crust outer layer.

FIG. 3 shows a typical 8-bit X-ray image of a loaf of bread with an outer hard crust layer. The lighter areas in the image represent the less dense areas whereby there is less attenuation of the X-ray radiation. The darker areas on the other hand represent the denser portions of the bread whereby the X-rays are more attenuated and thus produce low light emission by the phosphorescent strip. Since the attenuation of the X-rays through a body is dependent upon the density of the body, the present applicant has realized that by measuring the degree of attenuation of the X-rays through the body a physical parameter associated with the body such as the weight or the volume can thus be determined. It is known that the attenuation of the penetrating radiation through the body follows an exponential relationship and since the attenuation of the radiation is related to the energy absorbed by the body, the present applicant has realized that by measuring the energy of absorption of the X-rays by the body a parameter associated with the body can thus be derived.

Figure 4:
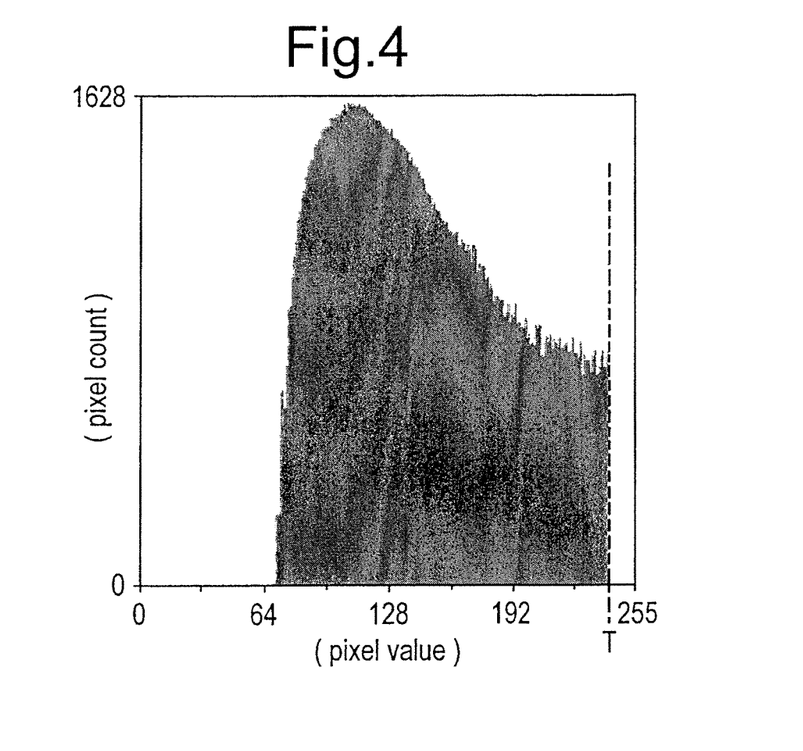
FIG. 4 is a histogram derived from the image shown in FIG. 2.

A typical histogram derived from an image is shown in FIG. 4. The histogram represents the frequency of the number of pixels in the image having a digital brightness value ranging from 0 to a maximum, e.g. 255 for an 8-bit digital image. Areas of the image which lie outside the boundaries of the product and which therefore have a brightness value beyond a threshold value T in FIG. 4 have their histogram values (pixel counts) set to zero prior to subsequent data processing steps. Otherwise, pixel counts which are too high (the majority of the image being white: maximum brightness 255 or near maximum brightness; attenuated only by the conveyor and not the object) will swamp the statistics. Since the value of each pixel below the threshold value T is proportional to the energy of the X-ray radiation attenuated by the product and impinging on the detector, the total area of the histogram (generally known as the volume of the histogram) represents the total energy absorbed by the irradiated product.

For an 8-bit image, this is given by the equation:

$$VH = \sum_{n=0}^{n=255} ((255-n) \times \text{Histogram}(n)) \quad (1)$$

Where:—
VH is the total volume of the histogram
n is the brightness value (0 to 255)
Histogram(n) is the frequency of pixels (i.e. pixel count) with a particular brightness value.

The term (255-n) concentrates on the darker areas as the higher pixel values represent the lighter areas.

The mean of the energy absorbed by each pixel of the irradiated product corresponds to the mean of the histogram (again ignoring pixel counts for pixel values higher than the threshold, T) which is represented by the equation:—

$$MH = \frac{\sum_{n=0}^{n=255} (n \times \text{Histogram}(n))}{\sum_{n=0}^{n=255} \text{Histogram}(n)} \quad (2)$$

Different algorithms can be derived empirically that relate the values of VH in equation 1 and MH in equation in 2 to an arbitrary amount which follows an exponential relationship to the weight or volume or mass of the body. It is found that the relationship between VH, MH and the amount is dependent upon the type of product being examined. For example a simple linear algorithmic relationship between the values of VH, MH and the amount is particularly applicable for homogenous products such as cheese. However, for different kinds of inhomogeneous product (e.g. having different variations in density or shape, as found in bread having an outer dense crust layer as shown in FIG. 3), the relationship is not as straightforward. The same applies to objects contained in irregular packaging such as pizza boxes. To cater for such variable products further algorithms based on a different relationship between VH, MH and the amount, and yet showing an exponential relationship to the weight of the product, can be derived and used. In the embodiment particularly described below the relationship between VH, MH and the amount is given by three possible alternative algorithms:—

$$\text{amount} = VH \times \ln(N-MH) \quad (3)$$

$$\text{amount} = VH \times (N-MH) \quad (4)$$

$$\text{amount} = VH \times (N-MH)^2 \quad (5)$$

where N is the number of discrete brightness values per pixel, e.g. $2^8$=256, for an 8-bit image.

The algorithms are not restricted to the above three equations (3, 4, and 5) and further algorithms may be established to determine an amount which shows an exponential relationship to a physical parameter associated with the object or product, e.g. volume or weight. In the particular embodiment the above three algorithms are used to cater for the different product types. The exponential relationship between an arbitrary amount calculated from the algorithm to the weight of the object is given by:—

$$y = ce^{b(\text{amount})} \quad (6)$$

Where:—
y is the parameter (weight or volume in this case)
c and b are first and second constants.

Figure 5:
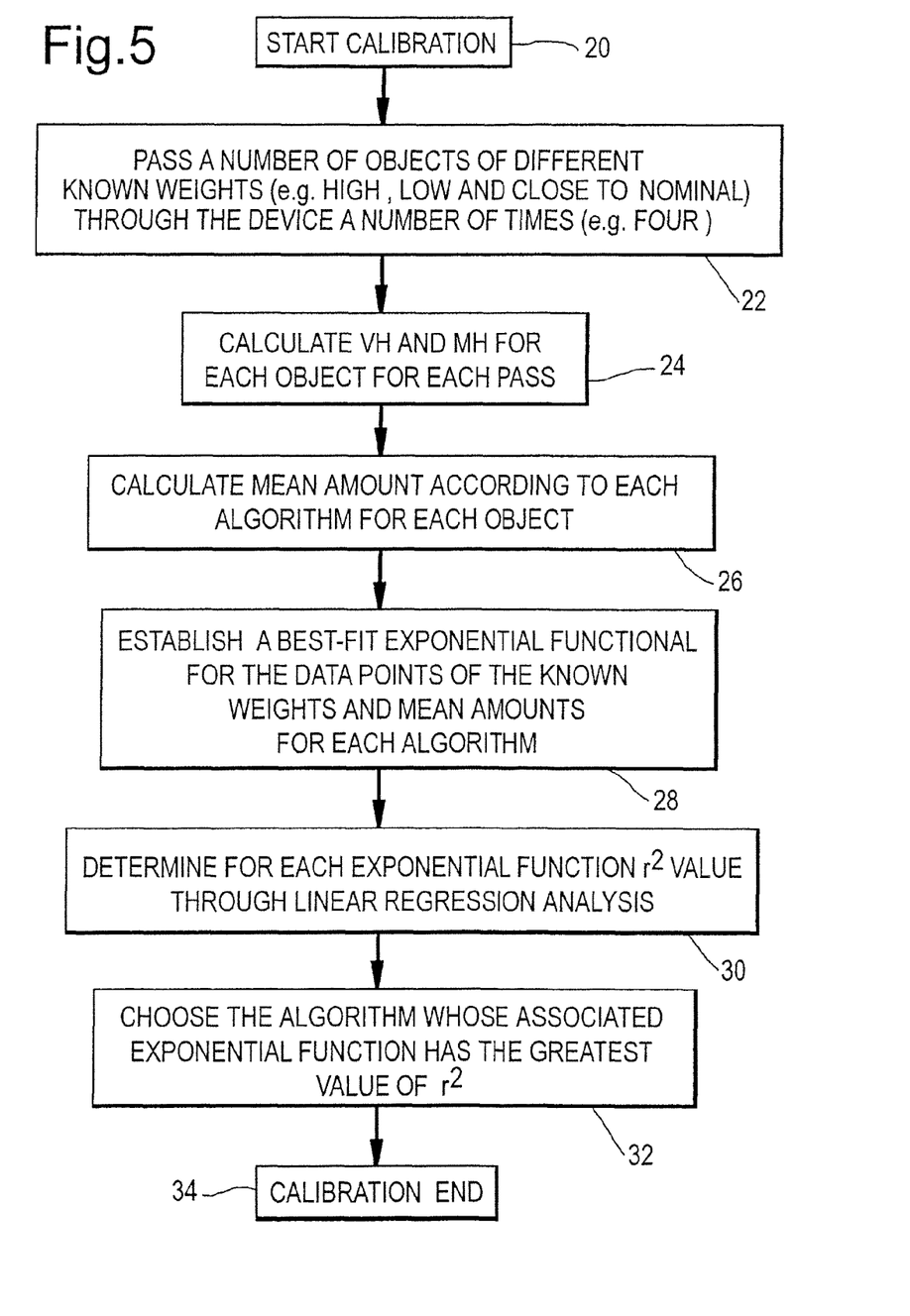
FIG. 5 is a flow chart illustrating an initial calibration of the checkweigher device in accordance with an embodiment of the invention.

The first stage in the checkweighing or volume or mass determination procedure (for brevity, referred to simply as weighing in the following description) is a calibration stage, wherein a correlation is established between the values of VH and MH in equations 1 and 2 to the weight of the product. This is established by determining which of the above three algorithms for a particular product best follows an exponential relationship to the weight of the product. FIG. 5 is a flow chart illustrating the calibration process of the checkweigher device. At the start 20 of the calibration process, the irradiation zone is cleared. In step 22, a known weight of the product under investigation (for example representative of an "underweight" product) is passed through the irradiation zone a number of times, e.g. four times. By passing the same product through the irradiation zone a number of times a mean value of the amount is thus obtained. This is repeated for similar products but having different known weights (for example a weight very close to an ideal or target weight, and a representative "overweight" product). In step 24 the processing unit 12 calculates the value of VH and MH from a histogram derived from the image for each pass of each product weight. In step 26 the processor calculates the arbitrary amounts in accordance with each of the algorithms in use, for example in accordance with equations 3 to 5 above, or any other selected algorithm. The resulting arbitrary values are then averaged over the number of passes for each weight of product and algorithm, to provide a mean arbitrary amount for each algorithm and product weight. In step 28, best-fit exponential functions are derived for the data points (known weight, mean amount) for each algorithm, i.e. the constants b and c in equation (6) are determined, e.g. by linear regression. The algorithm that provides the closest exponential fit can also be determined, having data points with the greatest $r^2$ value (step 30). A perfect exponential fit would therefore have an $r^2$ value of 1.0. The algorithm providing the greatest $r^2$ value can then be selected in step 32 and used to determine the weight (physical parameter) of products inspected after the calibration process is complete (step 34).

Alternatively some of the data processing such as calculating histogram volumes and means, VH, MH, and calculating the resulting arbitrary amounts for each known weight product and algorithm in each pass, can be carried out on-the-fly, as the product samples of known weight are being passed through the inspection zone, rather than waiting until all the known weight product samples have passed through the required number of times. It may not be necessary to pass each known weight sample product through the inspection zone several times, but it is usually desirable to do so, for greater accuracy. Other statistical means can be used to establish a best fit between the calculated arbitrary amounts and the weight of the product.

For a completely different product type the whole calibration process shown in FIG. 5 is repeated to establish the appropriate algorithm for that particular product.

Once the checkweigher device is calibrated, the weight of an object or product can be determined by passing it through the irradiation zone. From the chosen algorithm in the calibration stage a value of the arbitrary amount is thus calculated and is fed into equation (6) to finally determine the product weight.

It is believed that the present invention is not restricted to determining the weight of an object and any other physical parameter which follows a similar attenuation relationship to the X-ray radiation can be determined, such as the volume.

Moreover since the present invention is not dependent upon gravity, the present invention can be used in the determination of mass of the product. The present invention is not restricted to X-rays and any other suitable form of penetrating radiation can be used.

EXAMPLE

A loaf of bread having a relatively hard outer crust is chosen as the test product due to its variable density. Three sample loaves of bread (Loaf 1; Loaf 2; Loaf 3) are first weighed on a conventional weighing balance to determine their weights. Their weights are 593 g, 615 g and 732 g respectively. The bread samples are used to calibrate the checkweighing device as described above. The first bread sample (Loaf 1) is passed through the irradiation zone four times and a value of VH and MH is determined each time from the histogram. This is repeated for the other bread samples (Loaf 2 and Loaf 3). Table 1 shows the values of VH and MH for the three bread samples.

For the first bread sample (Loaf 1) the arbitrary amounts are calculated for each time the bread sample has passed through the irradiation zone, using each of the three algorithms of equations 3 to 5. This is shown in Table 2a. A mean value of the arbitrary amount is then calculated for each of the algorithms. This is repeated for the other bread samples (Loaf 2 and Loaf 3) as shown in Tables 2b and 2c. (Note the figures for the arbitrary amounts are divided by 10 000, 10 000 000 and 1 000 000 000 for equations 3 to 5 respectively, to give the figures returned more convenient magnitudes; this does not affect the subsequent calculations).

Figure 6:
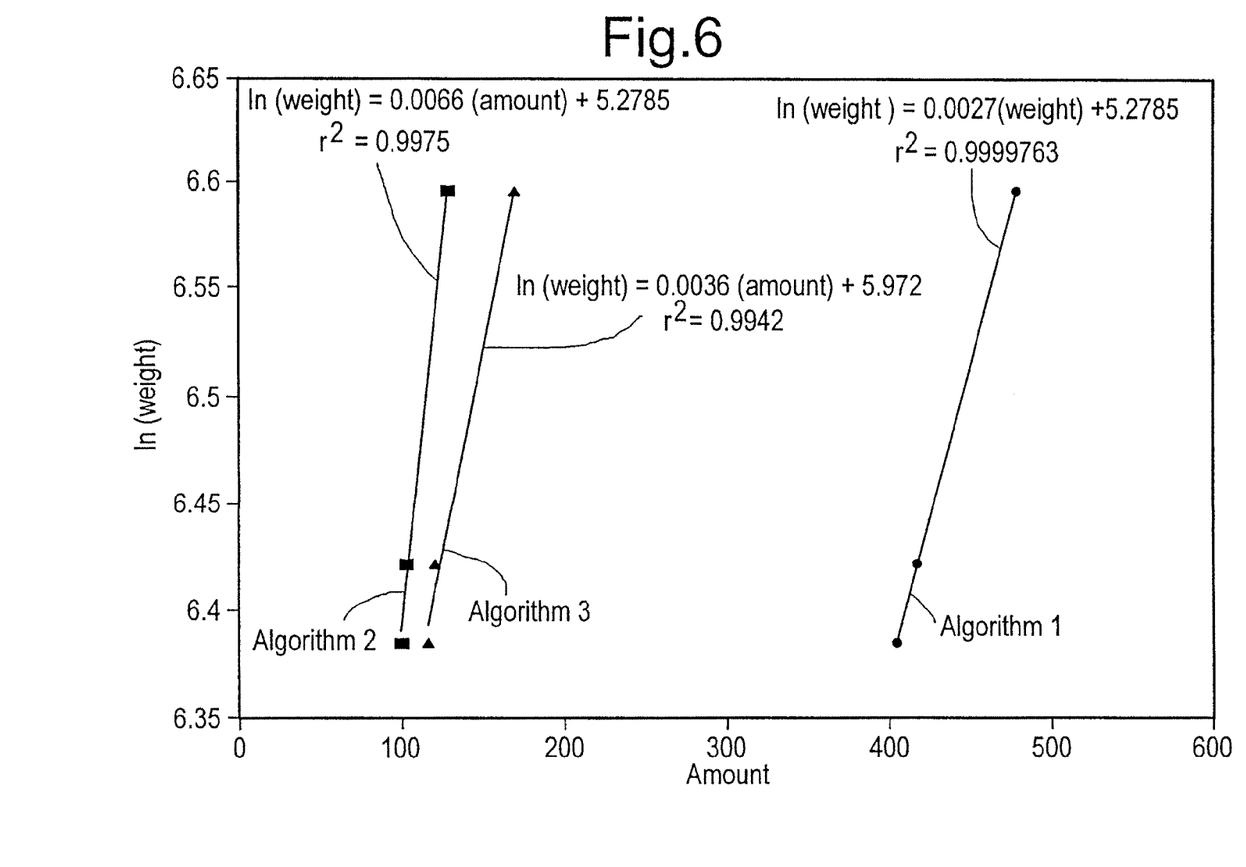
FIG. 6 is a plot of log (weight) for three bread samples against the calculated arbitrary amount of the three algorithms.

A logarithmic plot of the weight against the calculated amounts is shown in FIG. 6. Although all three points show a close fit to a straight line, algorithm 1 given by amount=VH× ln(N−MH) is the most promising algorithm having an $r^2$ value of 0.9999. For this algorithm the first constant b is 0.0027278 and the second constant c is 196.079123.

Following calibration as above, a sample of bread of weight 673 g is passed through the irradiation zone and the values of VH and MH are calculated to be 9469659 and 132.8991 respectively. Using algorithm 1 (eqn. 3) the value of the arbitrary amount is calculated to be:—

$$\text{Amount} = \frac{9469659 \times \ln(N - 132.8991)}{10000} = 455.0027$$

From the calculated value of the amount above the weight is given by using equation 6, thus:—

Weight=$ce^{b(amount)}$=
   $196.079123 e^{0.0027278 \times 455.0027}$=678.3 g

This represents an error of just 0.8% which is well within the accuracy required by industrial standards and consumer legislation.

TABLE 2a

| Pass | Algorithm1 VH × ln(255 − MH) | Algorithm2 VH × (255 − MH) | Algorithm3 VH × (255 − MH)² |
|---|---|---|---|
| 1 | 405.1364 | 99.423656 | 116.1589445 |
| 2 | 406.2999 | 99.749438 | 116.5991125 |
| 3 | 406.4682 | 99.810658 | 116.7001187 |
| 4 | 405.6511 | 99.536176 | 116.2699986 |
| Average | 405.8889 | 99.629982 | 116.4320436 |

TABLE 2b

| Pass | Algorithm1 VH × ln(255 − MH) | Algorithm2 VH × (255 − MH) | Algorithm3 VH × (255 − MH)² |
|---|---|---|---|
| 1 | 419.6814573 | 103.5550224 | 121.8217 |
| 2 | 417.9625579 | 103.0997132 | 121.2397 |
| 3 | 419.2790905 | 103.6635649 | 122.2595 |
| 4 | 418.4621684 | 103.3597249 | 121.7493 |
| Average | 418.8463185 | 103.4195063 | 121.7675 |

TABLE 2c

| Pass | Algorithm1 VH × ln(255 − MH) | Algorithm2 VH × (255 − MH) | Algorithm3 VH × (255 − MH)² |
|---|---|---|---|
| 1 | 483.8116 | 131.046 | 173.4031 |
| 2 | 484.3298 | 131.2327 | 173.7276 |
| 3 | 481.6509 | 130.1252 | 171.6281 |
| 4 | 481.9921 | 130.2001 | 171.6983 |
| Average | 482.9461 | 130.651 | 172.6143 |

TABLE 3

| Constants | Algorithm1 VH × ln(255 − MH) | Algorithm2 VH × (255 − MH) | Algorithm3 VH × (255 − MH)² |
|---|---|---|---|
| b | 0.002727761 | 0.00664248 | 0.003618691 |
| c | 196.0791049 | 307.5587425 | 392.2880076 |
| $r^2$ | 0.999976263 | 0.997467784 | 0.994172218 |

The invention claimed is:

1. A method of determining a physical parameter of an object using penetrating radiation comprising the steps of:
   a. passing the penetrating radiation through the object;
   b. determining a first value derived from the total energy of penetrating radiation absorbed by the object;
   c. determining a second value related to the mean energy per unit area of penetrating radiation absorbed by the object;
   d. determining the physical parameter from the first and second values;
   wherein an algorithm representing a proportionality relationship is derived from the first and second value;

TABLE 1

| | Loaf 1 (593 g) | | Loaf (615 g) | | Loaf (732 g) | |
|---|---|---|---|---|---|---|
| Pass | VH | MH | VH | MH | VH | MH |
| 1 | 8509946 | 138.1677 | 8802735 | 137.3604 | 9903535 | 122.6776 |
| 2 | 8533470 | 138.108 | 8767385 | 137.4054 | 9913239 | 122.6187 |
| 3 | 8536553 | 138.0785 | 8789614 | 137.0613 | 9865846 | 123.1054 |
| 4 | 8521072 | 138.1882 | 8774781 | 137.2082 | 9873173 | 123.1274 | wherein the algorithm is used to generate an amount having an exponential relationship to the physical parameter; and, wherein the algorithm generates the amount by derivation from any one of $VH \times \ln(N-MH)$ or $VH \times (N-MH)$ or $VH \times (N-MH)^2$ where VH is the volume of the histogram; MH is the mean of the histogram and N is the number of discrete brightness values per pixel.

2. A method as claimed in claim 1 wherein the detector comprises of at least one sensor which generates a signal in response to the penetrating radiation incident upon it.

3. A method as claimed in claim 2 wherein the signal is used to generate an image of the object.

4. A method as claimed in claim 2 wherein a histogram representing the energy of penetrating radiation absorbed per unit area of the object is derived from the signal.

5. A method as claimed in claim 4 wherein the first value equal to the total energy of penetrating radiation absorbed by the object is derived from the histogram.

6. A method as claimed in claim 4 wherein the second value equal to the mean energy of the penetrating radiation absorbed per unit area of the object is derived from the histogram.

7. A method as claimed in claim 1 wherein the energy of the penetrating radiation is represented as discrete brightness levels of a plurality of pixels.

8. A method as claimed in claim 1 wherein the exponential relationship between the physical parameter and the amount is given by $y = ce^{b(amount)}$ where y is the physical parameter; and c and b are first and second constants.

9. A method as claimed in claim 1, wherein the method further comprises a calibration stage having the steps of:
   a. passing a plurality of sample objects through the penetrating radiation for each of which the physical parameter value is known;
   b. determining the corresponding amount for each sample object from said algorithm; and
   wherein the calibration stage is performed for each of the algorithms, and the algorithm which provides the best exponential fit between the physical parameter and the amount is selected to determine the physical parameter of a subsequent object.

10. A method as claimed in claim 9 in which each sample object is passed through the radiation a plurality of times in order to determine an average amount for that algorithm and physical parameter value.

11. A method as claimed in claim 9 wherein the algorithm is chosen by linear regression analysis, having the greatest $r^2$ value.

* * * * *